UNITED STATES PATENT OFFICE.

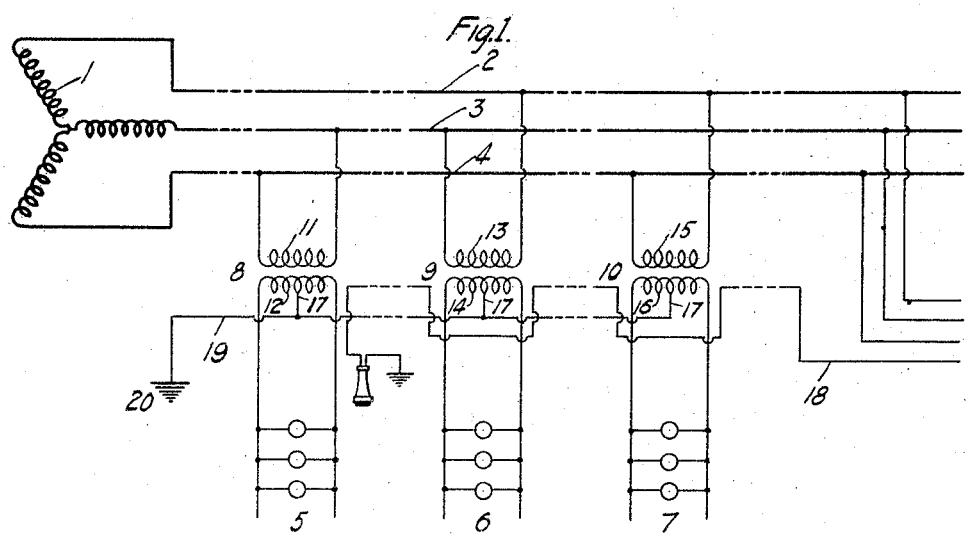

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

PROTECTIVE MEANS FOR DISTRIBUTING SYSTEMS.

1,339,923.  Specification of Letters Patent.  Patented May 11, 1920.

Application filed May 6, 1915. Serial No. 26,433.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Protective Means for Distributing Systems, of which the following is a specification.

My invention relates to electrical systems of distribution and it has special reference to means for minimizing the inductive disturbances that may be impressed upon an adjacent circuit, such as an intelligence-transmission circuit, by reason of the flow of ground currents between various grounded points in the distributing feeders of the system.

At the same time the stresses arising from the electrostatic potentials of the various portions of the distributing system may be maintained substantially low thereby protecting the insulation embodied in the transformers that are connected in circuit. Moreover, the static potentials of the conductors comprising the low-tension distributing feeder circuits may be maintained at low values to insure personal safety to those who may come into electrical contact with the conductors.

Since distributing circuits are usually in proximity to intelligence transmission circuits, such as telephone and telegraph circuits, it is necessary that, if protective means of the character above mentioned is employed, it be so constituted that no inductive disturbances, such as may interfere with the satisfactory operation of the proximate intelligence transmission circuits are impressed thereupon. To the accomplishing of this end, my invention is adapted because it precludes the flow of ground-currents which, as are well known, create serious disturbances upon telephone or telegraph circuits which are adjacent to their paths of flow.

To illustrate my invention more fully, reference may be had to the following description and the accompanying drawing in which the single figure is a diagrammatic view of an electrical distributing system embodying a form of my invention.

It is well known that a transformer having windings connected to a high-tension circuit and a low-tension feeder circuit is subjected to electrostatic stresses which depend upon the electrostatic capacity between the high and low-tension windings, and the electrostatic capacity between the low-tension winding and ground. Again, the electrostatic potential above ground of the middle point of an ungrounded low tension winding of a transformer is proportional to the electrostatic potential above ground of the middle point of the high-tension winding multiplied by the ratio of the electrostatic capacity between the high and low-tension windings to the sum of the electrostatic capacity between the high and low-tension windings and the electrostatic capacity between the low-tension winding and ground.

In accordance with the above-mentioned principles it will be apparent that under certain conditions, the electrostatic stresses imposed upon the windings of a transformer, between which a high electrostatic capacity exists and which are connected to a high-voltage transmission system and to a low-voltage distributing circuit, may be abnormally high when an accidental ground occurs upon the system. If a transformer of the above-mentioned character is connected to a polyphase system, the electrostatic stresses developed when one terminal of the transformer becomes grounded, may reach extremely high values.

In order to limit to safe values the electrostatic stresses imposed upon the low-tension winding of a transformer, it is a usual practice to directly ground the middle point of the low-tension windings. When this method is employed, the electrostatic stresses that may be imposed upon the low-tension windings are equal in value to the dynamic electromotive forces of the low-tension windings, inasmuch as the mid-points of the low-tension windings are rigidly held at zero electrostatic potential. In polyphase distributing systems which supply power to an extensive territory, it is necessary to employ a large number of distributing transformers in order to step down the high voltages of the transmission system to low voltages adapted for the numerous feeder-circuits. As above mentioned, these distributing feeder circuits are usually in proximity to intelligence transmission circuits, such as telephone and telegraph circuits. When the distributing circuits comprise single-phase systems which are connected in turn to a polyphase high-tension transmission system, the ground currents flowing between the various grounded points on the low-tension windings of the distributing transformers create inductive disturbances on the adjacent telephone lines which seriously interfere with the satisfactory transmission of intelligence.

Referring to the drawing, a high-tension winding 1 shown as a Y-connected winding, supplies power at high voltages to a transmission system comprising conductors 2, 3 and 4. To supply different zones or regions of the territory adjacent to the transmission system, distributing feeder circuits 5, 6 and 7, each constituting a different phase of the polyphase supply circuit, are connected to the transmission line at various widely spaced points along its length by means of step-down transformers 8, 9 and 10, respectively. It is desirable to have the loads connected to the phases of the transmission system, substantially balanced, and, to this end, the distributing circuits 5, 6 and 7 are severally connected to different phases of the transmission system.

It is, of course, impossible to balance exactly the loads connected to the different phases of the polyphase supply circuit or to maintain substantially balanced conditions in the distributing circuits at all times, since certain loads will vary with the time of day, the power demands or requirements of different localities and the like. It is obvious, therefore, that certain unbalancing of the electro-motive forces of the different phases of the polyphase supply circuit will always obtain to a greater or less degree. This unbalancing of the electro-motive forces of the high tension side of the polyphase supply circuit will also be manifest to a very substantial degree on the low tension side, comprising the distributing circuits, of the system. This unbalancing may be considered, in the main, as "electro-static" unbalancing which is a result of the varying potentials that obtain in the different feeder circuits connected to the various phases of the supply system. To compensate, in a measure, for this "electro-static" unbalancing, it is necessary that balancing or charging currents be permitted to flow between the various phases of the circuits so that the symmetrical electrical conditions, to which all polyphase systems attain—and particularly high voltage systems—may be substantially established. Such charging currents or balancing currents will flow if the phases are properly connected together or grounded at certain predetermined points.

The transformer 8 comprises a high-tension winding 11 and a low-tension winding 12, the transformer 9 comprises a high-tension winding 13 and a low-tension winding 14, and the transformer 10 comprises a high-tension winding 15 and a low-tension winding 16. Inasmuch as the electrostatic capacities between the windings 11 and 12, 13 and 14 and 15 and 16, and the electrostatic capacities between the low-tension windings 12, 14 and 16 and ground, are substantially high, the electrostatic stresses imposed upon the low-tension windings 12, 14 and 16, respectively, may, under certain conditions, be very dangerous. To maintain the electrostatic potentials of the low-tension windings 12, 14 and 16 and their associated conductors at safe values which will insure personal safety to those who may come in contact therewith, I have grounded mid-points 17 of the said low-tension windings, as explained above. However, it is necessary to ground the mid-points 17 of the low-tension windings through a medium which will not induce disturbances in an adjacent telephone circuit 18 that is in proximity to the distributing circuits 5, 6 and 7. If the mid-points 17 of the low-tension windings were grounded directly, ground or neutralizing currents would flow between these various grounded points which, in turn, would seriously affect the satisfactory operation of the telephone circuit 18. To overcome this difficulty, I have connected the mid-points of the transformer windings 12, 14 and 16 to a common conductor 19 which is grounded at 20. In this manner, the balancing currents circulating between the various transformers are confined to the conductor 19, thereby precluding the flow of ground currents. At the same time, the electrostatic potentials imposed upon the distributing circuits 5, 6 and 7 are limited to the values of the dynamic electromotive forces induced in the secondary windings 12, 14 and 16.

While the distributing circuits fed from different phases of the polyphase supply circuit are balanced, in a degree, by properly arranging the loads to be supplied with electrical energy, a more effective balancing of the potentials of the various phases may be brought about only by the flow of balancing currents between the grounded mid-points of the transformer windings 12, 14 and 16. These balancing currents may be considerable when poorly distributed loads are imposed on the several phases of the supply circuit or when a ground occurs on one of the feeder circuits or when other abnormal conditions obtain that affect the electrostatic or potential balancing of the electro-motive forces imposed upon the various phases. Such unbalancing currents will flow between the several mid-points of the transformer secondaries connected to the several phases of a polyphase circuit because of the inherent tendency of all electrical polyphase systems to remain balanced or symmetrical. Furthermore, when the mid-points of the several transformer secondaries tend to vary their electrical potentials, as unbalancing occurs in the different phases, balancing or charging currents will flow through the ground between these grounded mid-points in an effort to restore or maintain balanced electrical conditions in the system. If the mid-points of the transformer secondaries were not grounded, such ground currents could not flow and the electrical potentials of the mid-points would vary as the unbalancing of the distributing phases varies.

It is well known that ground currents seriously impair the operation of adjacent telephone circuits, telegraph circuits and the like, because ground currents flow over large areas of the earth in the form of "sheets." If such ground currents were confined to a restricted path, such as a conductor, the inductive effects arising therefrom would be imposed upon those lines only that were immediately adjacent thereto and no possibility of affecting seriously remote telephone circuits would exist. But, when currents are permitted to flow through the ground in the form of "sheets" over large areas, these currents seriously impair the operation of telephone circuits remote from the distributing lines, as well as those telephone circuits adjacent to the distributing lines.

Therefore, if the flow of ground currents is confined to a conductor, particularly in city districts that are supplied with electric power from distributing feeders which extend to the various distributing centers, telephone lines will not be seriously influenced by the inductive effects of ground or balancing currents when such currents are confined to a restricted path, such as a conductor, and not permitted to traverse in the form of "sheets" through the earth.

These balancing currents may comprise relatively high frequency currents, such as triple harmonic currents when the distributing system is a three-phase system. It will be appreciated that the high frequency currents that are usual in polyphase systems will more seriously impair the operation of adjacent telephone lines than the flow through the earth of fundamental frequency charging currents. Other frequencies that are multiples of the third harmonic, may also obtain in three-phase systems.

While the conductor 19 is grounded at 20, it will be apparent that it need not necessarily be grounded in order to lessen the stresses imposed upon the secondary or low-tension circuits 5, 6 and 7. The neutralizing or charging currents flowing over the conductor 19 will tend to maintain the interconnected mid-points 17 of the transformer windings 12, 14 and 16 at a common and substantially low-potential. At all times, it is desirable to maintain the loads upon the circuits 5, 6 and 7 substantially equal in amount in order to lessen the magnitudes of the charging currents flowing between the low-tension windings of the transformers.

While I have explained my system as applied to a three-phase distributing system, it will be apparent to those skilled in the art that my system will be equally effective in any polyphase distributing system. At the same time, the inductive effects imposed upon proximate intelligence transmission circuits will be substantially negligible, inasmuch as ground currents for balancing the system are substantially precluded from flowing. The flow of these balancing currents are confined to a conductor 19 which, as is well known, creates negligible disturbances only on an adjacent telephone circuit.

I claim as my invention:

1. The combination with a conductor of an independent electrical circuit, of a polyphase transmission system, single-phase distributing feeder-circuits that are disposed in inductive relation to said independent electrical circuit, spaced transformers connecting said feeder circuits to the several phases of said polyphase transmission system and having taps at mid-points of some of their windings, and an insulated metallic conductor grounded at one end for so connecting all of said taps to a common point that no part of the working currents traversing said feeder circuits may normally flow in said metallic conductor.

2. The combination with a conductor of an independent electrical circuit, of a polyphase transmission system, a plurality of single-phase distributing circuits disposed in inductive relation to said independent electrical circuit, transformers widely spaced from one another for connecting the distributing circuits to the several phases of said polyphase transmission system and having taps at the mid-points of their secondary windings, and an insulated metallic conductor that is grounded at one end for so connecting together all of said taps that no part of the working currents traversing said distributing circuits may normally flow in said metallic conductor.

3. The combination with an intelligence transmission circuit, of a high tension polyphase transmission system, low-tension single-phase feeder circuits disposed in inductive relation to said intelligence transmission circuit, spaced transformers severally connecting said single-phase feeder circuits to the various phases of the transmission system and having taps at the midpoints of their low tension windings, and a metallic conductor grounded at one end for connecting together all of said taps in order to confine thereto the flow of balancing currents to the exclusion, under normal operating conditions, of the working currents traversing the feeder circuits.

In testimony whereof, I have hereunto subscribed my name this 30th day of April, 1915.

CHARLES LE G. FORTESCUE.